US011307131B2

(12) United States Patent
Ju et al.

(10) Patent No.: US 11,307,131 B2
(45) Date of Patent: Apr. 19, 2022

(54) VISUALIZATION SYSTEM AND METHOD FOR MULTIPHASE FLUIDS DISPLACEMENT EXPERIMENT WITH LARGE VISCOSITY DIFFERENCE IN COMPLEX PORE STRUCTURE

(71) Applicant: CHINA UNIVERSITY OF MINING AND TECHNOLOGY, BEIJING, Beijing (CN)

(72) Inventors: Yang Ju, Beijing (CN); Jiangtao Zheng, Beijing (CN); Wei Chang, Beijing (CN); Chaodong Xi, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 17/296,998

(22) PCT Filed: Apr. 26, 2020

(86) PCT No.: PCT/CN2020/086907
§ 371 (c)(1),
(2) Date: May 26, 2021

(87) PCT Pub. No.: WO2021/217286
PCT Pub. Date: Nov. 4, 2021

(65) Prior Publication Data
US 2022/0091013 A1    Mar. 24, 2022

(51) Int. Cl.
*G01N 23/00*    (2006.01)
*G01N 15/08*    (2006.01)
*G01N 23/046*    (2018.01)

(52) U.S. Cl.
CPC ....... *G01N 15/0826* (2013.01); *G01N 23/046* (2013.01)

(58) Field of Classification Search
CPC .................. G01N 15/0826; G01N 23/046
See application file for complete search history.

(56) References Cited

FOREIGN PATENT DOCUMENTS

| CN | 105869496 A | 8/2016 |
|----|-------------|--------|
| CN | 105973783 A | 9/2016 |

(Continued)

OTHER PUBLICATIONS

English translation CN 109596499. 2019.*

(Continued)

*Primary Examiner* — Dani Fox
(74) *Attorney, Agent, or Firm* — Yue (Robert) Xu; Apex Attorneys at Law, LLP

(57) ABSTRACT

A visualization system and method for a multiphase fluids displacement seepage experiment with large viscosity difference in a complex pore structure. The visualization system includes: an injection pump assembly, a visualized complex pore model, a vacuum pressure pump and an image acquisition device; the system and method are printed by a 3D printing device to form the visualized complex pore model with at least two permeability, and displacement fluid mediums of different viscosities are injected into the visualized complex pore model through different injection pumps during an experiment, so that not only is the penetration of the same viscosity in the complex pore structure with different permeability observed, but also the displacement and plugging effect of different viscosities successively entering the complex pore structure with different permeability is realized.

7 Claims, 4 Drawing Sheets

(56) References Cited

FOREIGN PATENT DOCUMENTS

| | | | |
|---|---|---|---|
| CN | 106053168 A | | 10/2016 |
| CN | 108195647 A | | 6/2018 |
| CN | 109596499 A | * | 4/2019 |
| CN | 109596499 A | | 4/2019 |
| CN | 109883924 A | | 6/2019 |
| CN | 110608933 A | | 12/2019 |
| WO | 2018085782 A1 | | 5/2018 |

OTHER PUBLICATIONS

International Search Report for PCT/CN2020/086907 dated Jan. 28, 2021, ISA/CN.
Ju Yang et al., Visualization method of rock complex structure and stress field based on 3D printing technology, Chinese Science Bulletin, Nov. 30, 2014, vol. 59 No. 32: 3109-3119.

* cited by examiner

VISUALIZATION SYSTEM AND METHOD FOR MULTIPHASE FLUIDS DISPLACEMENT EXPERIMENT WITH LARGE VISCOSITY DIFFERENCE IN COMPLEX PORE STRUCTURE

The present application is a National Phase entry of PCT Application No. PCT/CN2020/086907, filed on Apr. 26, 2020, the entire disclosure of which is incorporated herein by reference.

FIELD

The present disclosure relates to the technical field of research on a displacement experiment in a complex pore structure, and in particular to a visualization system and method for a displacement experiment of multiphase fluids with large viscosity difference in a complex pore structure.

BACKGROUND

An existing research method of a displacement experiment is the process of using an injection device to inject fluid into a pore model. Commonly used pore models include: a sand-filled model, a real core and a glass bead model, etc. The sand-filled model squeezes sandstone into a fixed-shaped mold through a constant pressure, and controls the squeezing pressure to adjust the porosity of the model; the real core experiment completely retains its internal pore structure; the glass bead model controls the porosity and permeability of the model by adjusting the size, proportion and different arrangement positions of the glass bead, and realizes the visualization of a displacement process through an image acquisition device.

Although the sand-filled model meets the experimental requirements on important parameters such as porosity, it cannot meet the consistency of a pore structure compared with a real core and the visualization of the experimental process; due to the uniqueness of the structure, the real core model cannot meet the requirements of repetitive experiments; in addition, the glass bead model can realize the visualization of the displacement process, but cannot meet the requirement for the authenticity of the pore structure of the model. These defects cause most pore models lacking a true simulation of a microscopic pore structure of a porous medium material, which affects the analysis and judgment of experimental results, and ultimately leads to an inaccurate conclusion.

In order to improve oil recovery, people have set their sights on a large number of oil reservoirs existing in a low-permeability zone of a reservoir. These oil reservoirs cannot be exploited by a conventional water flood recovery method, thus different polymer gel plugging agents with large viscosity differences have entered vision of people. The huge differences in the viscosity of different fluids can realize the blocking of a channel of a high permeability zone in the reservoir, so that the polymer displacement fluid with relative lower viscosity is diverted by the seepage in the reservoir during multiple injection, forcing this type of displacement fluid with relative low viscosity into the reservoir of the low permeability zone, so as to realize the displacement development of the reservoir in the channel of the low permeability zone. The multiphase fluids displacement experiment with large viscosity difference is of great significance for improving oil production efficiency.

At present, there are many difficulties in exploring the development process of multiphase fluids displacement with large viscosity difference through a physical experiment: such as reconstruction of a complex pore structure model of a real reservoir, diversion injection of multiphase fluids with large viscosity difference, and visualization of an experimental process.

In recent years, with the rise of 3D printing technology and its wide application, more and more people choose to use 3D printing technology to make a microscopic seepage pore model, which utilizes transparent polymer materials to print and restore the characteristics of the complex pore structure of porous medium with high precision, and meets the demand of making a real pore structure model.

Currently, limited by size and experimental environment, however, the pore structure of the 3D printing model is relatively simple, that is, the permeability of the pore structure of the 3D printing model is constant. On one hand, the complex pore structure of the rock formation cannot be truly restored, which results in a large difference between the simulated experiment and the real environment, and the experimental data cannot guide the actual mining work. For example, the present disclosure with Chinese Patent Publication No. 105973783A discloses "3D printing-based parallel fracture seepage experimental system and experimental method". The 3D printing model structure is too simple, and cannot truly restore the complex pore structure of the rock formation.

On the other hand, for the exploitation of oil reservoirs in heterogeneous structure reservoirs, these oil reservoirs cannot be produced by conventional water flood recovery method, and huge differences in viscosity of different fluids are generally required to realize the blocking of a channel of high permeability zones in the reservoirs. However, the permeability of the pore structure of a signal 3D printing model cannot simulate the displacement behavior of fluids with large differences in viscosity in real heterogeneous reservoirs.

That is to say, the existing displacement experimental system cannot realize the simulation of the displacement oil production environment of the heterogeneous structure reservoir.

Therefore, the technical issue sought to be addressed by those skilled in the art is how to realize the simulation of the complex pore structure in the multiphase fluids displacement oil recovery environment with high viscosity difference and improve the reliability of the simulation.

SUMMARY

A visualization system for a multiphase fluid displacement experiment with large viscosity difference in a complex pore structure is provided according to the present disclosure. The visualization system includes: an injection pump assembly, a visualization complex pore model, a vacuum pressure device and an image acquisition device; the visualization complex pore model includes an inlet and an outlet, and an interior includes at least two parts of a complex pore structure, and the permeability of each part of the complex pore structure is different;

the injection pump assembly includes at least two injection pumps, outlets of the injection pumps are communicated with the inlet of the visualization complex pore model; the injection pumps are configured to inject fluid mediums of different viscosities;

the vacuum pressure device is configured to provide a vacuum environment so that a displaced fluid medium is injected into the complex pore structure of the visualization complex pore model; and the image acquisition device is configured to capture an experimental image inside the visualization complex pore model in a displacement process in real time.

In the present disclosure, through scanning experimental samples with different permeability, a digital model of the complex pore structure model with at least two permeability is formed by splicing, then the visualization complex pore model is formed by printing through a 3D printing device, a displaced fluid medium is injected into the complex pore structure of the visualization complex pore model through the vacuum pressure device combined with the injection pump during an experiment. Displacement fluid mediums of different viscosities are injected into the visualization complex pore model through different injection pumps, so that not only is the penetration of the same viscosity in the complex pore structure with different permeability observed, but also the seepage of different viscosities successively entering the complex pore structure with different permeability is realized, and displacement experiments under different conditions are realized by controlling the viscosity difference, displacement rate and pressure difference of the driving fluid mediums. The flow path of the fluid in the complex structure during the above experiment may be observed from an outer side, or collected by an image acquisition device, and the information collected by the image acquisition device is for later theoretical research. The system can accurately, quickly, economically and intuitively realize the displacement experiment of a variety of fluids with different viscosities in the pore model with large permeability differences.

Optionally, the visualization complex pore model is formed by the following method:
scanning experimental samples with different permeability through a laboratory micro-CT scanning system to obtain CT scanning images of the complex pore structure with different permeability;
capturing the CT scanning images respectively corresponding to different permeability according to a predetermined ratio to form a grayscale image of the overall structure model by stitching;
performing image binarization processing on the grayscale image of the overall structure model formed by stitching to obtain a binary image constituting the complex pore structure; and
performing three-dimensional reconstruction of the binary image by a three-dimensional modeling software to obtain a digital model of the complex pore structure, and printing and forming the visualization complex pore model by using transparent materials according to the digital model of the complex pore structure.

Optionally, a first permeability zone, a second permeability zone, . . . and a Nth permeability zone are respectively captured from Nth CT scanning images, and the Nth permeability zone are successively spliced along a direction perpendicular to the flow of the medium to form an overall structure model, and the permeability decreases successively.

Optionally, the visualization complex pore model is a cuboid with a rectangular cross section, and the inlet and outlet of the visualization complex pore model are respectively sealed with a first conical joint and a second conical joint, the outlets of the injection pumps are communicated with an inlet of the first conical joint, and an outlet of the second conical joint is communicated with a liquid accommodating component at outside, and the liquid accommodating component is configured to contain the liquid flowing out of the visualization complex pore model.

Optionally, an outer end of the first conical joint defines ports in one-to-one correspondence with the injection pumps, and an interior of the first conical joint defines channels in one-to-one correspondence with the ports, and the channels are isolated from each other, inner ends of the channels are communicated with the inlet of the visualization complex pore model, and one injection pump is communicated with one of the ports through an independently arranged pipe.

Optionally, an inlet pipe segment of the visualization complex pore model is inserted into the first conical joint and the visualization complex pore model and the first conical joint are circumferentially sealed; an outlet pipe segment of the visualization complex pore model is inserted into the second conical joint, and the visualization complex pore model and the second conical joint are circumferentially sealed.

Optionally, two ends of an outer circumferential surface of the visualization complex pore model are also formed with mounting bosses, and the mounting bosses are formed with bolt mounting holes for mounting bolts locking to the first conical joint or the second conical joint.

In addition, a method for a multiphase fluids displacement seepage experiment with a large viscosity difference in a complex pore structure is also provided according to the present disclosure. The method specifically includes:
using a 3D printing device to print a visualization complex pore model, wherein the visualization complex pore model includes an inlet and an outlet, and an interior of the visualization complex pore model includes at least two parts of a complex pore structure, and the permeability of each part of the complex pore structure is different;
putting the entire printed visualization complex pore model into an ultrasonic cleaning machine for vibration cleaning;
injecting cleaning liquid into the visualization complex pore model at a predetermined pressure after vibration cleaning, and repeating it several times until support material in the visualization complex pore model is completely removed;
connecting outlets of a first injection pump, a second injection pump and a third injection pump to the inlet of the visualization complex pore model through independent pipes;
injecting a displaced fluid medium into the visualization complex pore model through the first injection pump, and stopping injecting the visualization complex pore model until the displaced fluid medium reaches the outlet of the visualization complex pore model, and moving the entire system including the visualization complex pore model and the injection pump to an interior of a vacuum pressure device for vacuuming, and stopping vacuuming until bubbles inside the visualization complex pore model move outside the complex pore structure during a vacuuming process;
taking the entire system out of the vacuum pressure device, turning on the first injection pump to continue injecting the visualization complex pore model with the displaced fluid medium, using gravity condition and density difference between the displaced fluid medium and the air to control a placement direction of the visualization complex pore model so that the bubbles are discharged from the outlet;
injecting a first driving fluid into the visualization complex pore model through the second injection pump, until the first driving fluid flows out from the outlet of the visualization complex pore model; wherein the viscosity of the first driving fluid is less than the viscosity of the displaced fluid medium;

injecting a second driving fluid into the visualization complex pore model through the third injection pump, until the second driving fluid flows out of the outlet of the visualization complex pore model; where the viscosity of the second driving fluid is greater than the viscosity of the displaced fluid medium; and when the first injection pump, the second injection pump, and the third injection pump are injected into the visualization complex pore model with liquids, capturing an experimental image inside the visualization complex pore model in real time in a displacement process for experimental analysis.

Optionally, the visualization complex pore model is formed by the following method:

scanning experimental samples with different permeability through a laboratory micro CT scanning system to obtain CT scanning images of the complex pore structure with different permeability;

capturing the CT scanning images respectively corresponding to different permeability according to a predetermined ratio to form a grayscale image of the overall structure model by stitching;

performing image binarization processing on the grayscale image of the overall structure model formed by stitching to obtain a binary image constituting the complex pore structure; and performing three-dimensional reconstruction of the binary image by a three-dimensional modeling software to obtain a digital model of the complex pore structure, and printing and forming the visualization complex pore model by using transparent materials according to the digital model of the complex pore structure.

Optionally, after the injection pumps are connected with the visualization complex pore model to form an overall system, before the driven fluid medium is injected, a tightness test may be performed: injecting deionized water gradually into the visualization complex pore model at a relative high pressure difference through the first injection pump, and observing in real time whether leakage occurs at each joint in the system; if no leakage occurs, disconnecting connecting pipes from the outlets of the injection pumps and an inlet of a containing component downstream of the outlet of the visualization complex pore model, and placing the visualization complex pore model with the inlet and the outlet connected with pipes in solid desiccant for a predetermined time to remove the deionized water remaining in a pore channel during the tightness test.

Optionally, the viscosity difference between the first driving fluid and the second driving fluid ranges from 1 to 15000 cp.

The method for multiphase fluids displacement experiment with the large viscosity difference in the complex pore structure according to the present disclosure is based on the above experimental visualization system for multiphase fluids displacement with large viscosity difference in the complex pore structure, so the method for multiphase fluids displacement experiment with the large viscosity difference in the complex pore structure also has the beneficial effects of the above experimental visualization system.

BRIEF DESCRIPTION OF THE DRAWINGS

In FIGS. 1 to 5:

| | |
|---|---|
| 1 | visualization complex pore model structure, |
| 2 | first mounting boss, |
| 2 | second mounting boss, |
| 3 | first sealing component, |
| 3' | second sealing component, |
| 4 | threaded fixing component, |
| 5 | first conical joint, |
| 51 | first port, |
| 52 | second port, |
| 53 | third port, |
| 54 | first channel, |
| 55 | second channel, |
| 56 | third channel, |
| 57 | screw hole, |
| 61 | joint, |
| 62 | screw hole, |
| 63 | channel, |
| 6 | second conical joint, |
| 7 | first injection pump, |
| 8 | second injection pump, |
| 9 | third injection pump, |
| 10 | liquid accommodating component, |
| 11 | image acquisition device, |
| 12 | injection pump assembly. |

DETAILED DESCRIPTION OF THE EMBODIMENTS

A large number of studies have been carried out on the exploitation of an oil reservoir in low permeability zone, and the studies have found that the huge differences in the viscosity of different fluids can realize the blocking of a channel of a high permeability zone in the reservoir, so that the polymer displacement fluid with relative low viscosity is diverted by the seepage in the reservoir during multiple injection, forcing this type of displacement fluid with relative lower viscosity into the reservoir of the low permeability zone, so as to realize the displacement development of the reservoir in the channel of the low permeability zone.

Based on the study findings, those skilled in the art have proposed an experimental visualization system that is able to realize the simulation of the complex pore structure in the multiphase fluids displacement oil recovery environment with high viscosity difference, and the reliability of the simulation is relatively high.

In order to enable those skilled in the art to better understand the technical solutions of the present disclosure, the present disclosure will be further described in detail below in conjunction with the experimental method, the visualization system, drawings and specific embodiments.

Figure 1:
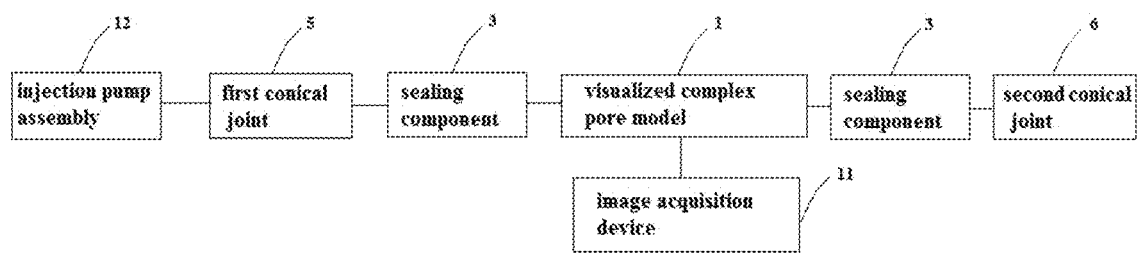
FIG. 1 is a block diagram of some components of an experimental visualization system for multiphase fluids displacement with large viscosity difference in a complex pore structure according to an embodiment of the present disclosure.
Figure 2:
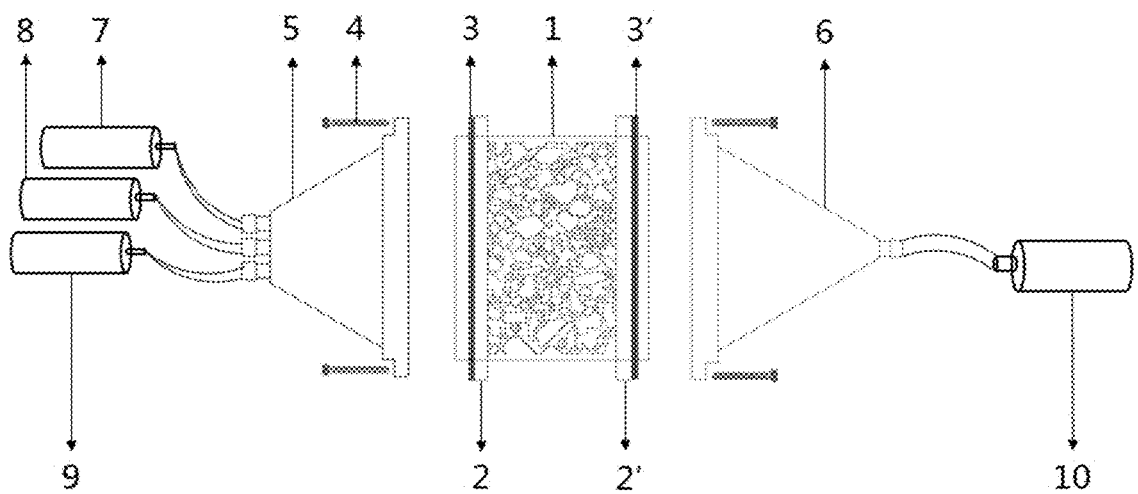
FIG. 2 is a structural schematic diagram of an experimental visualization system for multiphase fluids displacement with large viscosity difference in a complex pore structure according to an embodiment of the present disclosure.
Figure 3:
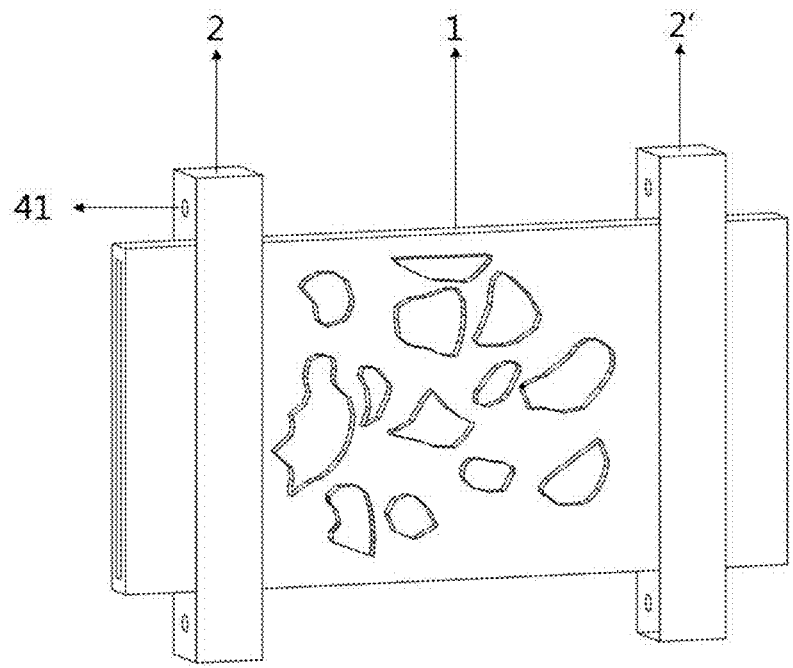
FIG. 3 is a structural schematic diagram of a visualization complex pore model structure according to an embodiment of the present disclosure.
Figure 4:
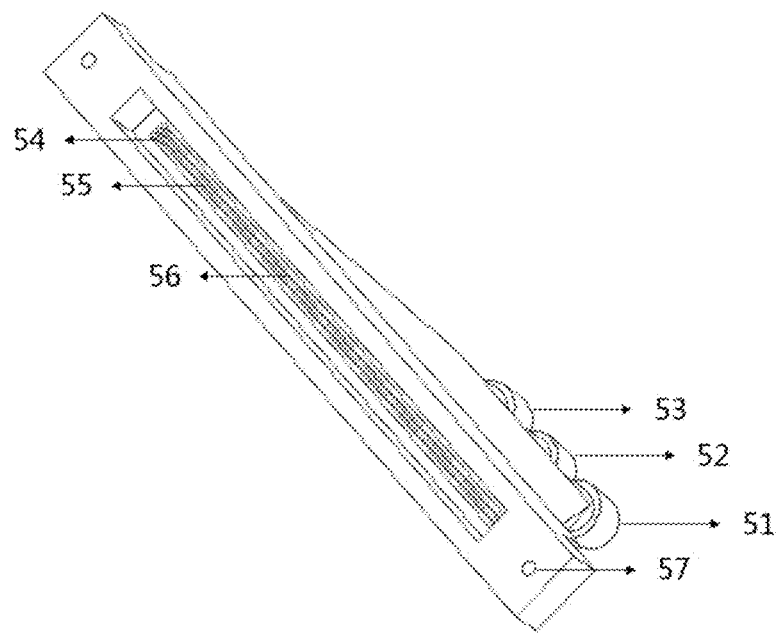
FIG. 4 is a structural schematic diagram of a first conical joint according to an embodiment of the present disclosure.
Figure 5:
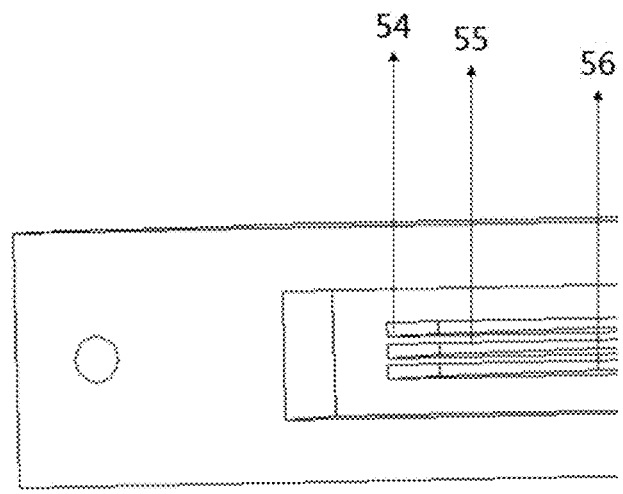
FIG. 5 is a partial enlarged diagram of the first conical joint shown in FIG. 4.
Figure 6:
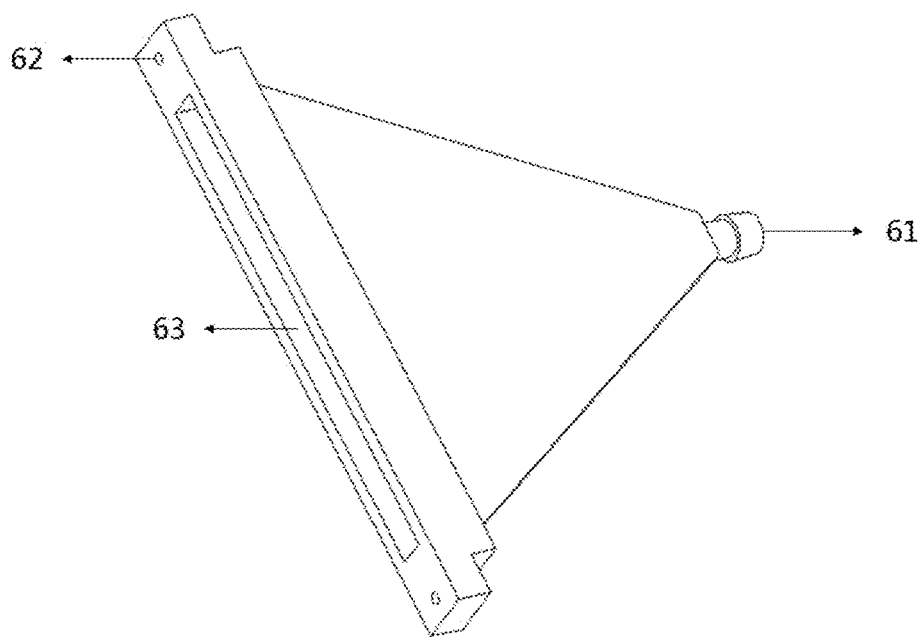
FIG. 6 is a structural schematic diagram of a second conical joint according to an embodiment of the present disclosure.
Figure 7:
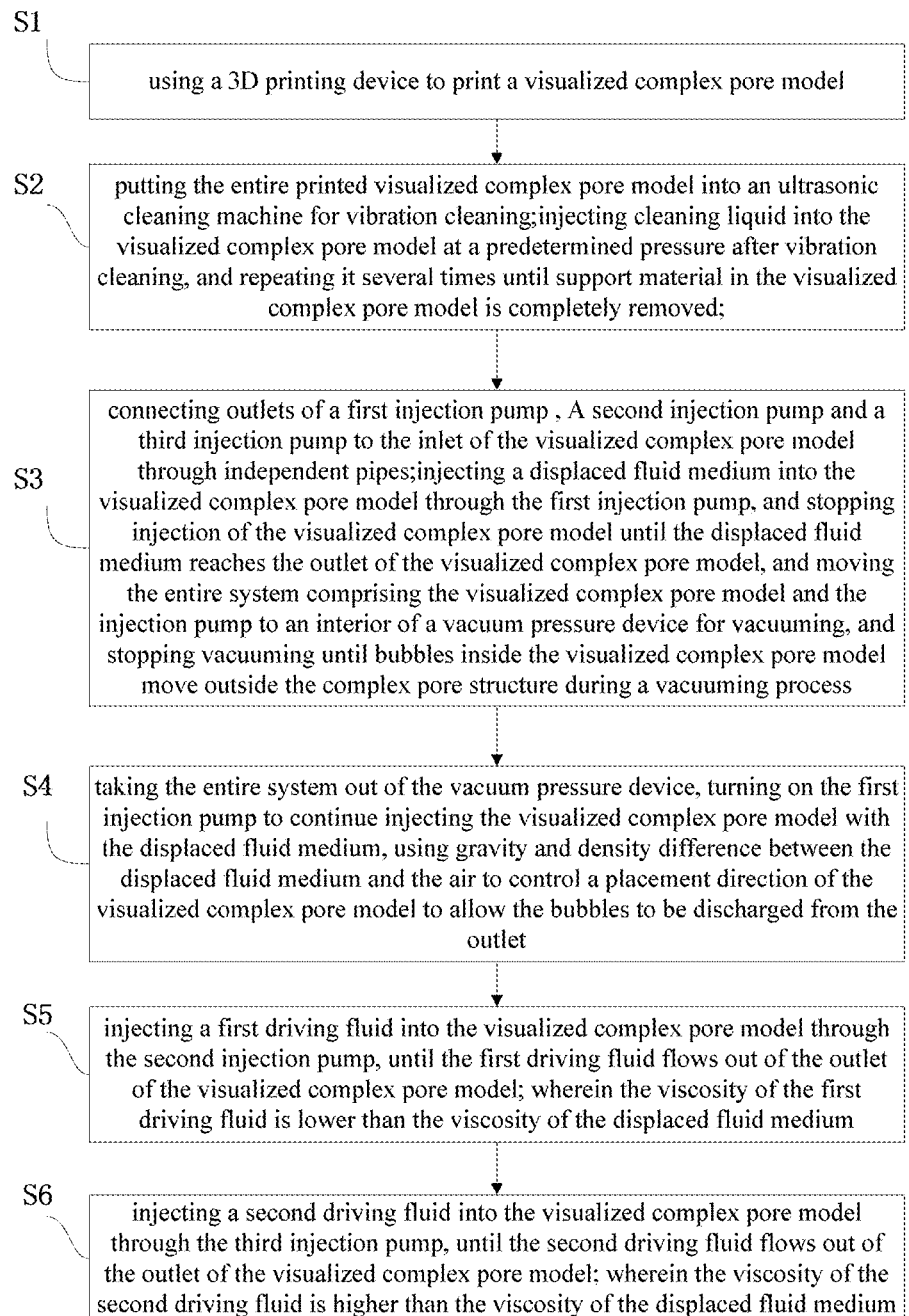
FIG. 7 is a flow chart of a method for a multiphase fluids displacement experiment with large viscosity difference in a complex pore structure according to an embodiment of the present disclosure.

Referring to FIGS. 1 to 6, FIG. 1 is a block diagram of part of components of an experimental visualization system for multiphase fluids displacement with large viscosity difference in a complex pore structure according to an embodiment of the present disclosure; FIG. 2 is a structural schematic diagram of an experimental visualization system for multiphase fluids displacement with large viscosity difference in a complex pore structure according to the embodiment of the present disclosure; FIG. 3 is a structural schematic diagram of a visualization complex pore model structure according to the embodiment of the present disclosure; FIG. 4 is a structural schematic diagram of a first conical joint according to the embodiment of the present disclosure; FIG. 5 is a partial enlarged diagram of the first conical joint shown in FIG. 4; FIG. 6 is a structural schematic diagram of a second conical joint according to the embodiment of the present disclosure.

A visualization system for multiphase fluids displacement experiment with large viscosity difference in a complex pore structure is provided according to the present disclosure, which includes: an injection pump assembly 12, a visualization complex pore model 1, a vacuum pressure pump and an image acquisition device 11. The vacuum pressure pump is not shown in FIG. 1, but this does not hinder those skilled in the art from understanding and implementing the following technical solutions herein.

The visualization complex pore model 1 includes an inlet and an outlet, and an interior thereof includes at least two parts of a complex pore structure, and the permeability of each part of the complex pore structure are different. The visualization complex pore model 1 is formed by printing through a transparent material, and the main purpose is to be able to be observed or collected the flow information of a fluid medium inside the complex pore structure from an outer side. The transparent material may be a transparent polyester material. The visualization complex pore model 1 may be prepared by high-precision 3D printer printing, and a minimum pore size of the complex pore structure may be 50 um.

The visualization complex pore model 1 according to the present disclosure includes at least two parts of the complex pore structure with different permeability, the formation of the above complex pore structure may be formed by scanning imaging of rock samples with different permeability, and then different parts of the imaging of the rock samples are captured to form a new image, and the visualization complex pore model 1 is printed through 3D modeling for the new image.

Specifically, the visualization complex pore model is formed by the following method.

First step is that, experimental samples with different permeability are scanned through a laboratory micro-CT scanning system, so as to obtain CT scanning images of the complex pore structure with different permeability.

Second step is that, the CT scanning images respectively corresponding to different permeability according to a predetermined ratio are captured to form a grayscale image of the overall structure model by splicing.

That is, different permeability zones are captured and spliced to form the grayscale image of the overall structure model, and a splicing position may be adaptively adjusted to meet the requirement of adjacent splicing boundary. The grayscale image of the overall structure model formed by such splicing includes images of the complex pore structure with at least two types of permeability. For example, a first permeability zone, a second permeability zone, . . . and a Nth permeability zone are respectively captured from N CT scanning images, and the N permeability zone are successively spliced along a direction perpendicular to the flow of the medium to form the grayscale image of the overall structure, and the permeability of the N permeability zones decreases successively. In the following of this article, the technical solutions and technical effects will continue to be introduced by taking the capture of the three types of permeability zones to form a grayscale image of the overall structure model.

In a specific embodiment, a first permeability zone, a second permeability zone, and a third permeability zone are respectively captured from three CT scanning images, and the three permeability zone are successively spliced along the direction perpendicular to the flow of the medium to form the grayscale image of the overall structure, and the permeability of the three permeability zones decreases successively.

Specifically, along the direction perpendicular to the flow of the medium (the vertical direction in the figure), the first permeability zone, the second permeability zone and the third permeability zone are captured and spliced according to 2:6:2 to form the grayscale image of the overall structure.

Third step is that, image binarization processing is performed on the grayscale image of the overall structure model formed by splicing, so as to obtain a binary image constituting the complex pore structure.

This application does not describe in detail the specific method of image binarization processing, and those skilled in the art can understand and implement the technical solution herein through the content recorded in this application.

Fourth step is that, three-dimensional reconstruction of the binary image is performed by a three-dimensional modeling software, so as to obtain a digital model of the complex pore structure, and transparent materials are used for printing the visualization complex pore model 1 according to the digital model of the complex pore structure. A fluid channel is formed on the visualization complex pore model 1, and the complex pore structure is formed inside the channel.

The injection pump assembly of the experimental visualization system provided according to the present disclosure includes at least two injection pumps, and outlets of the injection pumps may be communicated with the inlet of the visualization complex pore model 1; the injection pumps are configured to inject fluid mediums of different viscosities; in other words, the injection pumps provided in this application may inject fluid mediums of different viscosities into the visualization complex pore model 1.

The operating parameters such as the injection pressure, the injection flow rate, and the injection fluid speed of the injection pump may be controlled, so as to change the fluid injection mode according to the experimental plan to meet the experimental requirements.

A pressure device in this application is mainly configured to provide a vacuum environment, so that a displaced fluid medium is injected into the complex pore structure of the visualization complex pore model 1. The vacuum pressure device may be a vacuum pump, and it may also be a device capable of realizing the above function.

The image acquisition device 11 according to the present disclosure is configured to capture an experimental image inside the visualization complex pore model 1 in a displacement process in real time. In a specific embodiment, the image acquisition device is a high-resolution Digital Video (DV), which is able to continuously observe the displacement process inside the entire visualization complex pore model 1 in real time, and realize the visualized characterization analysis of images. The image acquisition device may also be a high-frequency camera, which can observe and analyze the entire displacement process through the photos taken by it.

Referring to FIG. 6, it is a flow chart of a method for multiphase fluids displacement experiment with a large viscosity difference in a complex pore structure according to an embodiment of the present disclosure.

On the basis of the above visualization system, a method for multiphase fluids displacement experiment with large viscosity difference in a complex pore structure is also provided according to the present disclosure, and the method specifically includes:

S1. a 3D printing device is used for printing a visualization complex pore model 1, in which the visualization complex pore model 1 is the above visualization complex pore model 1;

S2. the entire printed visualization complex pore model 1 is put into an ultrasonic cleaning machine for vibration cleaning; and cleaning liquid is injected into the visualization complex pore model 1 at a predetermined pressure after vibration cleaning, and this process is repeated several times until support material in the visualization complex pore model 1 is completely removed;

the maximum temperature of the ultrasonic cleaning machine may be set according to the specific model; in a specific embodiment, the maximum temperature of the ultrasonic cleaning machine is set to 40 degrees Celsius, until the temperature reaches the maximum temperature, the ultrasonic cleaning and vibration are stopped;

S3. outlets of a first injection pump 7, a second injection pump 8 and a third injection pump 9 are connected to the inlet of the visualization complex pore model 1 through independent pipes; a displaced fluid medium is injected into the visualization complex pore model 1 through the first injection pump 7, and the injection of the visualization complex pore model 1 is stopped until the displaced fluid medium reaches the outlet of the visualization complex pore model 1, and the entire system including the visualization complex pore model 1 and the injection pump is moved to an interior of a vacuum pressure device for vacuuming, and the vacuuming is stopped until bubbles inside the visualization complex pore model 1 move outside the complex pore structure during a vacuuming process;

S4. the entire system is taken out of the vacuum pressure device, the first injection pump is turned on to continue injecting the displaced fluid medium into the visualization complex pore model 1, and gravity condition and density difference between the displaced fluid medium and the air are used for controlling a placement direction of the visualization complex pore model 1 so that the bubbles are discharged from the outlet;

S5. a first driving fluid is injected into the visualization complex pore model 1 through the second injection pump 8, until the first driving fluid flows out of the outlet of the visualization complex pore model 1; and the viscosity of the first driving fluid is lower than the viscosity of the displaced fluid medium;

S6. a second driving fluid is injected into the visualization complex pore model 1 through the third injection pump 9, until the second driving fluid flows out of the outlet of the visualization complex pore model 1; and the viscosity of the second driving fluid is greater than the viscosity of the displaced fluid medium; and the viscosity difference between the first driving fluid and the second driving fluid ranges from 1 to 15000 cp;

when the first injection pump 7, the second injection pump 8, and the third injection pump 9 are injected into the visualization complex pore model 1 with liquids, an experimental image inside the visualization complex pore model 1 is captured in a real time in a displacement process for experimental analysis.

In the above step S3, after the injection pumps are connected with the visualization complex pore model 1 to form an overall system, a sealing step of the system may be checked before the driven fluid medium is injected to ensure that the system has good sealing. Specifically, deionized water is gradually injected into the visualization complex pore model 1 at a relative high pressure difference through the first injection pump 7, and the image acquisition device observes in real time whether leakage occurs at each joint in the system. If there is leakage, screws are used to further strengthen, or, a sealing component at a joint position is replaced; if there is no leakage, connecting pipes are disconnected from the outlets of the injection pumps and an inlet of a containing component 10 downstream of the outlet of the visualization complex pore model 1, and the visualization complex pore model 1 with the inlet and the outlet connected with pipes is placed in solid desiccant for a predetermined time, so as to remove the deionized water remaining in a pore channel during the tightness test. In a specific embodiment, the predetermined time is 24 hours, but it is not limited to the description here, as long as the deionized water inside the pore channel is able to be removed.

In the present disclosure, through scanning experimental samples with different permeability, the digital model of the complex pore structure model with at least two permeability is formed by splicing, then the visualization complex pore model is formed by printing through a 3D printing device, the displaced fluid medium is injected into the complex pore structure of the visualization complex pore model through the vacuum pressure device combined with the injection pump during the experiment. Displacement fluid mediums of different viscosities are injected into the visualization complex pore model through different injection pumps, so that not only the penetration of the same viscosity in the complex pore structure with different permeability may be observed, but also the displacement of different viscosities successively entering the complex pore structure with different permeability may be realized, and displacement experiments under different conditions are realized by controlling the viscosity difference of the driving fluid mediums. The flow path of the fluid in the complex structure during the above experiment may be observed from the outer side, or collected by the image acquisition device, and the information collected by the image acquisition device is for later theoretical research. The system can accurately, quickly, economically and intuitively realize the displacement experiment of a variety of fluids with different viscosities in the pore model with large permeability differences.

In a specific embodiment, the visualization complex pore model 1 may have a cuboid structure with a rectangular cross section, that is, the visualization complex pore model 1 includes a rectangular channel with open ends, and the complex pore structure is formed inside the rectangular channel. The inlet and outlet of the visualization complex pore model 1 are respectively sealed with a first conical joint 5 and a second conical joint 6, the outlets of the injection pumps are communicated with an inlet of the first conical joint 5, and an outlet of the second conical joint 6 is communicated with an external liquid accommodating component, and the liquid accommodating component is configured to contain the liquid flowing out of the visualization complex pore model 1.

The outlets of the injection pumps are communicated with an interior of the visualization complex pore model 1 through the pipes and the first conical joint 5. The interior of the visualization complex pore model 1 is communicated with external equipment through the second conical joint 6. The conical joints are able to achieve uniform fluid flow.

A sealing component may be provided between the first conical joint 5 and the visualization complex pore model 1, and between the second conical joint 6 and the visualization complex pore model 1. The sealing component may be a rubber ring or a polymer plastic material gasket, or a water stop belt.

In order to prevent the fluid mediums of different viscosities pumped by the injection pump from mixing before entering the complex pore structure, the following arrangements are also provided in this application.

In a specific embodiment, an outer end of the first conical joint 5 includes ports in one-to-one correspondence with the injection pumps, and an interior of the first conical joint 5 includes channels in one-to-one correspondence with the ports, and the channels are isolated from each other, inner ends of the channels are communicated with the inlet of the visualization complex pore model 1, and one injection pump is communicated with one of the ports through an independently arranged pipe Taking the above arrangement of the three injection pumps as an example, the first conical joint 5 includes a first port 51, a second port 52 and a third port 53, and the interior of the first conical joint 5 includes a first channel 54, a second channel 55 and a third channel 56; the first port 51 is in communication with the first channel 54, the first injection pump 7 is in communication with the first port 51 through a pipe; the second port 52 is in communication with the second channel 55, the second injection pump 8 is in communication with the second port 52 through a pipe; the third port 53 is in communication with the third channel 56, the third injection pump 9 is in communication with the third port 53 through a pipe.

In order to increase the tightness of the system, an inlet pipe segment of the visualization complex pore model 1 is inserted into the first conical joint 5 and the visualization complex pore model 1 and the first conical joint 5 are circumferentially sealed; an outlet pipe segment of the visualization complex pore model 1 is inserted into the second conical joint 6, and the visualization complex pore model 1 and the second conical joint 6 are circumferentially sealed.

Two ends of an outer circumferential surface of the visualization complex pore model 1 are also formed with mounting bosses, which are a first mounting boss 2 and a second mounting boss 2'. The mounting bosses are formed with screw holes 57 for mounting threaded fixing components 4 locking to the first conical joint 5 or the second conical joint 6, and the threaded fixing component 4 may be a screw rod or a bolt. The mounting bosses and the bolt mounting holes are all integrally formed in the 3D printing process of the visualization complex pore model. In a specific embodiment, the size of the bolt mounting holes may be about 1.6 mm, and the bolt mounting holes may be uniformly distributed along an axial direction, and the number is not limited.

The first mounting boss 2 and the second mounting boss 2' are respectively provided with a first sealing component 3 and a second sealing component 3', so as to increase the sealing performance with the connection components.

The visualization complex pore model 1 is fixedly connected with the conical joint through bolts, which increases the reliability and sealing of the connection between the visualization complex pore model 1 and the conical joint.

In the same way, the second conical joint 6 includes an internal channel 63, and a joint connected to an external pipe. The second conical joint 6 is also provided with a screw hole 62 for mounting a threaded fixing component matching and fixing with the visualization complex pore model 1.

Those skilled in the art may further realize that the units and algorithm steps of the examples described in the embodiments disclosed herein may be implemented by electronic hardware, computer software, or a combination of the two. In order to clearly illustrate the interchangeability of hardware and software, the composition and steps of each example have been generally described in accordance with functions in the above description. Whether these functions are executed by hardware or software depends on the specific application and design constrains of the technical solution. Professionals and technicians can use different methods to implement the described functions for each specific application, but such implementation should not be considered beyond the scope of this application.

The steps of the method or algorithm described in the embodiments disclosed herein can be directly implemented by hardware, a software module executed by a processor, or a combination of the two. The software module can be placed in a random access memory (RAM), an internal memory, a read-only memory (ROM), an electrically programmable ROM, an electrically erasable programmable ROM, a register, a hard disk, a removable disk, a CD-ROM, or any other form of storage medium known in the technical field. The above description of the disclosed embodiments enables those skilled in the art to implement or use this application. Various modifications to these embodiments will be obvious to those skilled in the art, and the general principles defined in this document can be implemented in other embodiments without departing from the spirit or scope of the application.

What is claimed is:

1. A visualization system for a multiphase fluids displacement seepage experiment with large viscosity difference in a complex pore structure, wherein the visualization system comprises: an injection pump assembly, a visualization complex pore model, a vacuum pressure device and an image acquisition device;

the visualization complex pore model comprises an inlet and an outlet, and an interior comprises at least two parts of a complex pore structure, and the permeability of each part of the complex pore structure is different;

the injection pump assembly comprises at least two injection pumps, outlets of the injection pumps are configured to be communicated with the inlet of the visualization complex pore model; the at least two injection pumps are configured to inject fluid mediums of different viscosities;

the vacuum pressure device is configured to provide a vacuum environment which allows a displaced fluid medium to be injected into the complex pore structure of the visualization complex pore model; and the image acquisition device is configured to capture an experimental image inside the visualization complex pore model in a seepage process in real time, wherein the visualization complex pore model is formed by the following method:

scanning experimental samples with different permeability through a laboratory micro CT scanning system to obtain CT scanning images of the complex pore structure with different permeability;

capturing the CT scanning images respectively corresponding to different permeability in accordance with a predetermined ratio to form a grayscale image of the overall structure model by splicing;

performing image binarization processing on the grayscale image of the overall structure model formed by splicing to obtain a binary image constituting the complex pore structure; and performing three-dimensional reconstruction of the binary image by a three-dimensional modeling software to obtain a digital model of the complex pore structure, and printing and forming the visualization complex pore model by using transparent materials in accordance with the digital model of the complex pore structure.

2. The visualization system for the multiphase fluids displacement seepage experiment with large viscosity difference in the complex pore structure according to claim 1, wherein a first permeability zone, a second permeability zone, . . . and a Nth permeability zone are respectively captured from N CT scanning images, and the N permeability zone are successively spliced along a direction perpendicular to the flow of the medium to form the grayscale image of the overall structure, and the permeability decreases successively.

3. The visualization system for the multiphase fluids displacement seepage experiment with large viscosity difference in the complex pore structure according to claim 1, wherein the visualization complex pore model is a cuboid with a rectangular cross section, and the inlet and outlet of the visualization complex pore model are respectively sealed with a first conical joint and a second conical joint, the outlets of the injection pumps are communicated with an inlet of the first conical joint, and an outlet of the second conical joint is communicated with a liquid accommodating component at outside, and the liquid accommodating component is configured to accommodate the liquid flowing out of the visualization complex pore model.

4. The visualization system for the multiphase fluids displacement seepage experiment with large viscosity difference in the complex pore structure according to claim 3, wherein an outer end of the first conical joint defines ports in one-to-one correspondence with the injection pumps, and an interior of the first conical joint defines channels in one-to-one correspondence with the ports, and the channels are isolated from each other, inner ends of the channels are communicated with the inlet of the visualization complex pore model, and one injection pump is communicated with one of the ports through an independently arranged pipe.

5. The visualization system for the multiphase fluids displacement seepage experiment with large viscosity difference in the complex pore structure according to claim 3, wherein an inlet pipe segment of the visualization complex pore model is inserted into the first conical joint and the visualization complex pore model and the first conical joint are circumferentially sealed; an outlet pipe segment of the visualization complex pore model is inserted into the second conical joint, and the visualization complex pore model and the second conical joint are circumferentially sealed.

6. The visualization system for the multiphase fluids displacement seepage experiment with large viscosity difference in the complex pore structure according to claim 3, wherein two ends of an outer circumferential surface of the visualization complex pore model are also formed with mounting bosses, and the mounting bosses are formed with bolt mounting holes for mounting bolts locking to the first conical joint or the second conical joint.

7. A method for a multiphase fluids displacement seepage experiment with large viscosity difference in a complex pore structure, the method specifically comprising:

using a 3D printing device to print a visualization complex pore model, wherein the visualization complex pore model comprises an inlet and an outlet, and an interior of the visualization complex pore model comprises at least two parts of a complex pore structure, and the permeability of each part of the complex pore structure is different;

putting the entire printed visualization complex pore model into an ultrasonic cleaning machine for vibration cleaning;

injecting cleaning liquid into the visualization complex pore model at a predetermined pressure after vibration cleaning, and repeating it several times until support material in the visualization complex pore model is completely removed;

connecting outlets of a first injection pump, a second injection pump and a third injection pump to the inlet of the visualization complex pore model through independent pipes;

injecting a displaced fluid medium into the visualization complex pore model through the first injection pump, and stopping injection of the visualization complex pore model until the displaced fluid medium reaches the outlet of the visualization complex pore model, and moving the entire system comprising the visualization complex pore model and the injection pump to an interior of a vacuum pressure device for vacuuming, and stopping vacuuming until bubbles inside the visualization complex pore model move outside the complex pore structure during a vacuuming process;

taking the entire system out of the vacuum pressure device, turning on the first injection pump to continue injecting the visualization complex pore model with the displaced fluid medium, using gravity and density difference between the displaced fluid medium and the air to control a placement direction of the visualization complex pore model to allow the bubbles to be discharged from the outlet;

injecting a first driving fluid into the visualization complex pore model through the second injection pump, until the first driving fluid flows out of the outlet of the visualization complex pore model; wherein the viscosity of the first driving fluid is lower than the viscosity of the displaced fluid medium;

injecting a second driving fluid into the visualization complex pore model through the third injection pump, until the second driving fluid flows out of the outlet of the visualization complex pore model; wherein the viscosity of the second driving fluid is higher than the viscosity of the displaced fluid medium; and when the first injection pump, the second injection pump, and the third injection pump are injected into the visualization complex pore model with liquids, capturing an experimental image inside the visualization complex pore model in a real time in a seepage process for experimental analysis, wherein the visualization complex pore model is formed by the following method:

scanning experimental samples with different permeability through a laboratory micro CT scanning system to obtain CT scanning images of the complex pore structure with different permeability;

capturing the CT scanning images respectively corresponding to different permeability according to a predetermined ratio to form a grayscale image of the overall structure model by splicing;

performing image binarization processing on the grayscale image of the overall structure model formed by splicing to obtain a binary image constituting the complex pore structure; and performing three-dimensional reconstruction of the binary image by a three-dimensional modeling software to obtain a digital model of the complex pore structure, and printing and forming the visualization complex pore model by using transparent materials in accordance with the digital model of the complex pore structure.

\* \* \* \* \*